Figure 1:
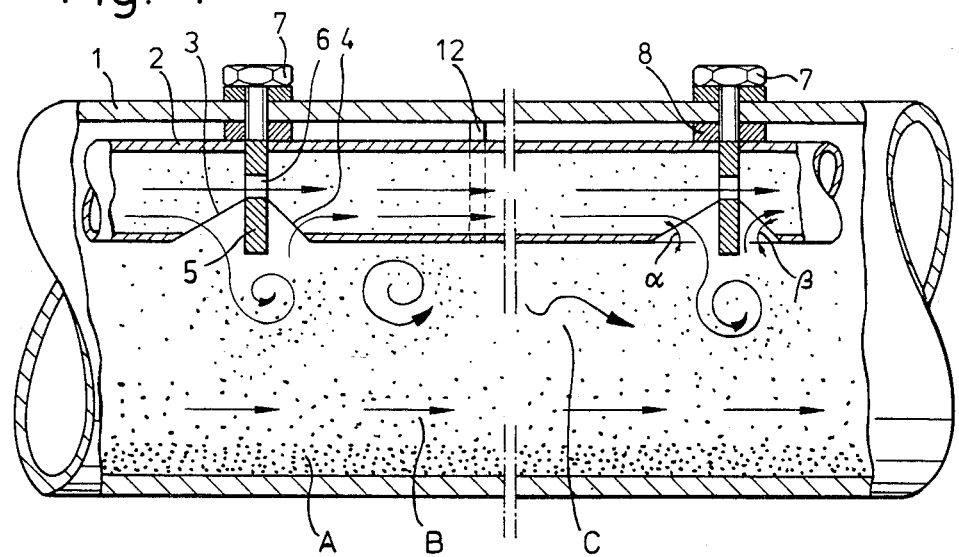

United States Patent [19]

Möller et al.

[11] Patent Number: 4,595,317

[45] Date of Patent: Jun. 17, 1986

[54] DEVICE FOR PNEUMATIC AND HYDRAULIC FEEDING OF BULK GOODS

[75] Inventors: Hermann Möller, Hamburg; Edgar Muschelknautz, Leverkusen; Jürgen Pust, Wedel, all of Fed. Rep. of Germany

[73] Assignee: Johannes Moeller Hamburg GmbH & Co. KG, Hamburg, Fed. Rep. of Germany

[21] Appl. No.: 700,875

[22] PCT Filed: Sep. 1, 1984

[86] PCT No.: PCT/EP84/00265

§ 371 Date: Jan. 10, 1985

§ 102(e) Date: Jan. 10, 1985

[87] PCT Pub. No.: WO85/01276

PCT Pub. Date: Mar. 28, 1985

[30] Foreign Application Priority Data

Sep. 15, 1983 [DE] Fed. Rep. of Germany ....... 3333261

[51] Int. Cl.⁴ .............................................. B65G 53/52
[52] U.S. Cl. ....................................... 406/95; 138/42; 138/44; 138/111; 138/115; 406/191
[58] Field of Search ............................ 406/191, 95, 86; 366/340; 181/227, 233; 138/42, 44, 111, 115

[56] References Cited

U.S. PATENT DOCUMENTS

| 3,240,531 | 3/1966 | Lippert et al. | 406/191 X |
| 3,524,478 | 8/1970 | Rapp et al. | 138/111 |
| 3,626,986 | 12/1971 | Rapp et al. | 406/191 |
| 3,759,578 | 9/1973 | Muschelknautz et al. | 406/95 |

Primary Examiner—Jeffrey V. Nase
Attorney, Agent, or Firm—Michael J. Striker

[57] ABSTRACT

The subject matter of the application is a device for pneumatically or hydraulic feeding of dust-like, powdery or granulated bulk goods which has a feed line with an inner pipe mounted therein extending concentrically thereto, being provided with outlet and inlet openings. In order subject the bulk goods in the feed line of such a device to a continuous strong turbulence, so that no plugs of goods can form, but on the other hand to have the possibility to dissolve such plugs of goods if they form it is provided as a solution that a vertically disposed disk (5) is provided in the inner pipe (2) between an outlet and an inlet opening (3,4) which is provided with at least one opening (6) which preferably consists of a circular hole, being provided in the center of disk (5), or which consists of a slot (13). Thereby, the disk (5) may be eccentrically disposed between the outlet opening and inlet opening (3,4) and may be exchangeably mounted in inner pipe (2).

21 Claims, 12 Drawing Figures

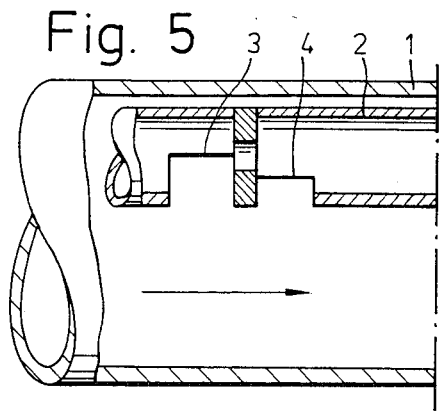
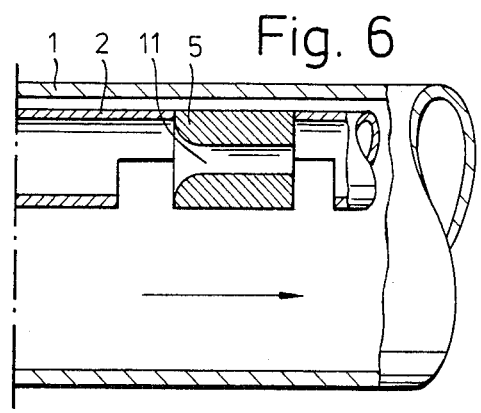
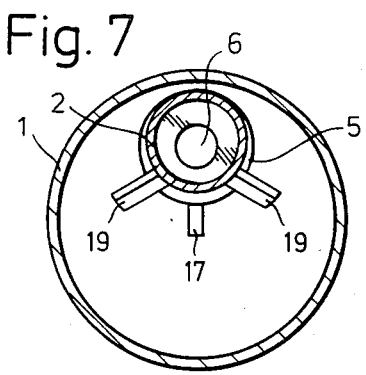
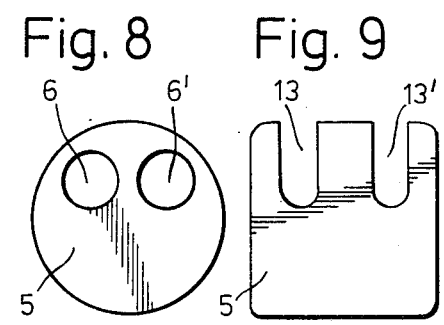
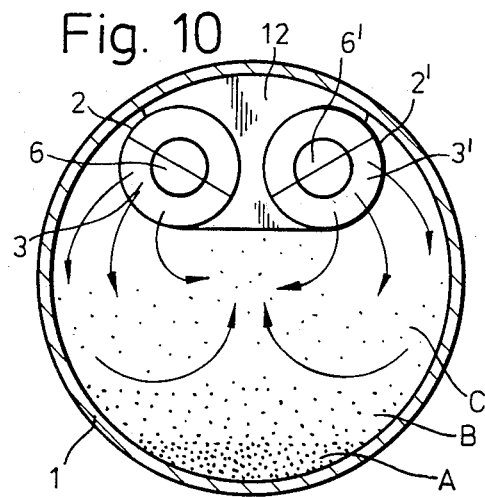
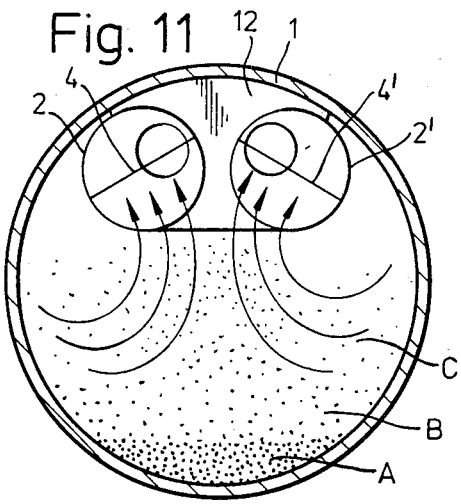
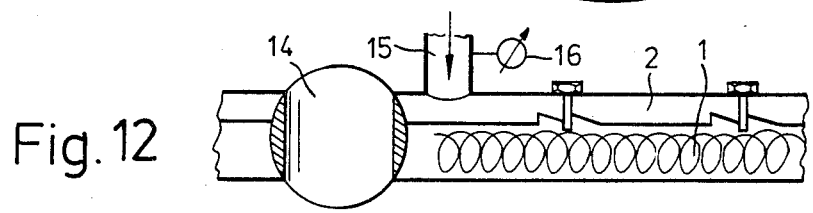

DEVICE FOR PNEUMATIC AND HYDRAULIC FEEDING OF BULK GOODS

The invention relates to a device for pneumatic or hydraulic feeding of dust-like, powdery or granular bulk goods, consisting of a feed line with an inner pipe mounted therein extending concentrically thereto being provided with outlet and inlet openings.

In accordance with DT-PS No. 1 174 256 it is known to feed dustlike or granulated bulk goods in a pipe, wherein the main flow in longitudinal direction of the flow is partially branched off in short distance spaced successive locations and that the partial flow which flows separately from the main flow, due to the branching off, is again fed back into the main flow shortly before the next branch location when seen in flow direction. For this purpose, a device with a feed line and parallel branch lines had been suggested which both discharge into the feed line, whereby a plurality of such short branch lines are provided in longitudinal direction adjacent to this pipeline. They may also be mounted within the feed line. It is assumed that the bulk goods is to be fed in form of so-called plugs of goods. This is possible with the known device as long as finely granulated bulk goods is fed. With bulk goods which tend to form a slight wall deposit or where the particles have a diameter of a few millimeters the danger of blockage of the narrow branch lines exists, so that they become ineffective. In accordance with a recent development DT-PS No. 15 068 848 a continuous branch line is provided adjacent the main feeding line, instead of a plurality of short branch lines, which is provided with inlet and outlet openings which are disposed at a distance with respect to each other. A shut off of the branch line is provided between these equally large inlet and outlet openings, so that the total feed medium of the branch line is fed at those distances into the main line and again out of there and back into the branch line. Such a design is less expensive than the design of a plurality of independent branch lines adjacent to the main feed line. However, this device is merely suitable to divide a plug of goods for a further feeding when it becomes stuck in the feed line, because when the feeding of the material runs normally the largest part of the feeding air flows into the main feed line because it does not have any cause to flow through the branch line or channel, since the same has a substantially higher flow resistance. The feeding air gets into the branch channel only when the feeding stops in the main feed line, for example, when a plug of goods is stuck, so that the air can and must exit the channel at the location where the plug of goods is stuck. The same is accomplished with a further known device (DT-PS No. 2 102 301), wherein the branch line is not completely blocked at the locations at which one each outlet and inlet openings are disposed. In accordance with this patent it is known to provide a first baffle plate on the bottom directed obliquely against the feeding flow extending into the branch channel and to provide a second baffle plate successively to the first one in the same direction for forming a reentry opening. With this design it should also be possible to obtain a dividing of a plug of goods by introducing feeding air from the branch channel when the plug of goods is stuck in the feed line. However, an essential disadvantage of this design is to be seen in that the flow in the branch line is deflected by the baffle plates to the upper side of the branch line, thus causing a wear thereon caused by the turbulences, whereby it should be taken into consideration that high speed of the feeding air is generated in the branch line and the air is filled with granulated material. Consequently, repairs which are resulting therefrom are rather expensive. A further disadvantage is to be seen in that the baffle plates which extend into the branch lines cannot be changed in their positions or only with a great effort once they are installed, which however should be made possible for feeding different types of material. Generally, it should be noted with respect to this known device that it only obtains a pointed effect with its inlet and outlet openings with respect to dissolving a stuck plug of goods at the locations, but it is not suitable to prevent the forming of plugs of goods with the provided means and that this also cannot be achieved with the known devices, because they are all based on a feeding of bulk goods in form of plugs of goods.

It is an object of the invention to make a device wherein the bulk of goods is continuously subjected to a strong turbulence, so that no danger of forming of plugs of goods is to be expected to begin with, but on the other hand there are also the possibilities to provide for dividing a plug of goods in such cases. This is to be achieved without the danger of damages to the wall of the branch line by a deflection of the feeding air or another type of feeding medium like a liquid feeding medium. In accordance with the invention a solution is provided in that a vertical standing disk is disposed in the inner pipe between an outlet and an inlet opening which is provided with at least one opening through which a partial flow of the branch line can pass without being deflected against the wall of the inner line. Thereby, the opening of the disk consists always of a circular hole which is disposed in the center of the disk or eccentrically thereto. On the other hand, the opening may consist of a plurality of holes or slots. The size of the opening should be about 0.1–0.3 of the face of the inner pipe in any case.

The diameter of the disk may be larger than the inner pipe itself so that a stronger deflection is caused for the feeding flow into the main flow and thereby resulting in the formation of stronger turbulences which prevent the forming of plugs of goods in the feed line. When this disk is larger than the outer diameter of the branch line, the turbulence of the main flow is reinforced by the protruding part in the case that unfavorable conditions prevail, namely pressure differentials, whereby only reduced feeding air flow moves through the branch line. The disk may also be height adjustable, so that it can be adapted in its position to the given prevailing conditions.

In order to improve the effect of the air discharging from the discharge opening of the inner pipe to the total cross section of the feed line and thereby improve the turbulence for the bulk goods so as to eliminate plugs of goods, it has been to be advantageous that the discharge opening is provided with a bevelled cut, so that the main flow discharges in direction of the longest aeration path. Moreover, the discharge opening may be designed larger than the subsequent inlet opening. For that it can depend deeper into the inner pipe or may have another cut angle, namely a smaller one than the opening of the inlet.

A possibility of a later change of the discharge and inlet openings is provided by the measure to insert or press the disk with its opening into a sleeve into which the two ends of the inner line are inserted, because this arrangement permits to easily exchange sleeves of different length as well as disks with different opening size against each other.

Furthermore, a disturbance edge for initiating the turbulence may be provided on the sleeve extending into the feed pipe.

With severe wearing feeding goods the disk may be designed as a cylinder which is provided with a jet-like bore.

A further influencing of the formation of turbulence in the feeding line is provided with the possibility to orient the outlet and inlet openings to different sides, so that curve-like air flows are provided in the feeding line. In this manner it is also advantageous if a plurality of inner pipes with disks are provided in the feed line, whereby the openings in the disks are directed into different directions and which in addition may be disposed offset with each other in axial direction and/or may be provided with different cut angles with respect to the pipe axis. Optimum flow conditions can be obtained in this case in dependency from the type of goods to be fed, if the inner pipe is mounted in a heightwise adjustable position in the feed pipe.

In a further embodiment of the invention it is provided that partition walls are disposed in a distance with respect to each other in the feed line between the inner pipe and the upper side of the feed line, so as to prevent air flowing with high speed in the free space between two inner pipes which does significantly contribute to the actual feeding of the bulk goods and its turbulence during the feeding.

A further embodiment of the invention provides to mount small imeller like shoulders laterally on the inner pipe which generate turbulences in accordance with the effect of the Vortex-generator known from aircraft construction. In view of the low speeds of fed medium and fed goods with which the device operates in accordance with the invention, a wear of these shoulders is not present, but they permit to enlarge the distance of the openings in the branch pipe.

Even the device in accordance with the invention cannot exclude that a continuous plug of goods may form in the feed line, for example, during a breakdown of a compressor for the feeding air. In order to dissolve the same, additional lines may be provided which enable a dissolving of a plug by an additional compressed air supply, after shutting off the preceding line segments. Such an operation may be automated by means of technical auxilliary means and may be controlled with selfadapting controls.

Figures 3, 4:
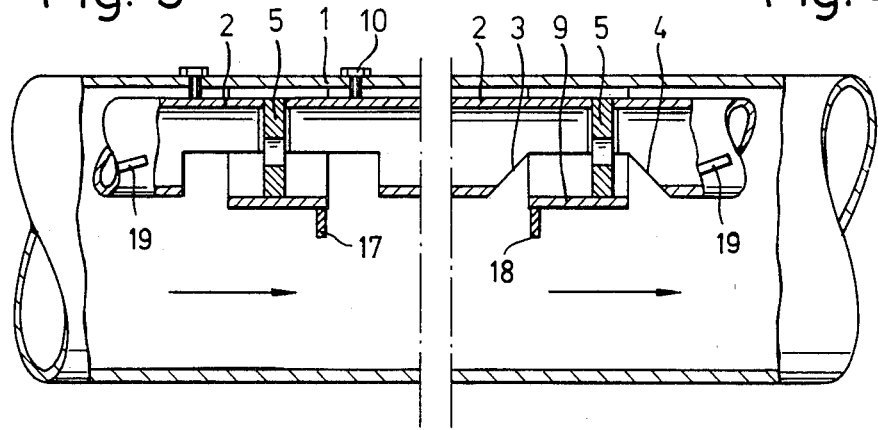
Figure 2:
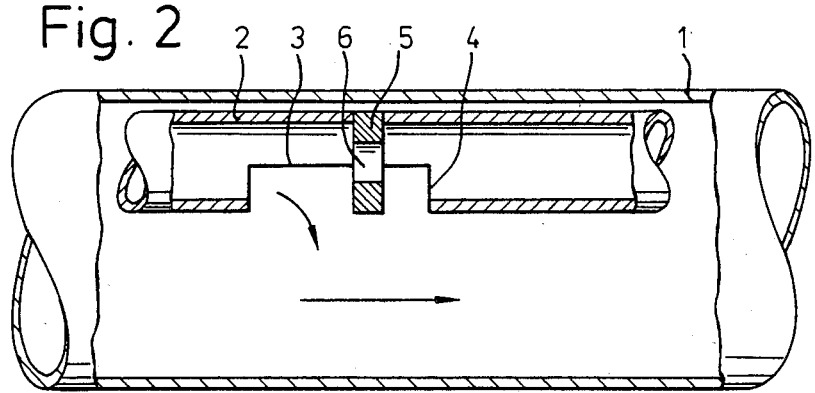

Exemplified embodiments of the invention are explained in the following in conjunction with a drawing. The drawing shows:

FIG. 1. a feed line with an inner pipe in a longitudinal section;

FIG. 2. a partial section of a feed line with an aperture disk;

FIG. 3. a partial section of a feed line with an aperture disk held in place by a sleeve and a disturbance edge mounted on the outside of the sleeve, FIG. 4. an embodiment in accordance with FIG. 3 in modified shape;

FIG. 5. a partial section of a feed line with enlarged discharge opening;

FIG. 6. a feed line with a jet-like cylinder instead of the disk;

FIG. 7. a cross section of the feed line in a schematic illustration with impeller like shoulders in the manner of Vortex-generators mounted lateral on the inner pipe;

FIG. 8. an aperture disk with two holes;

FIG. 9. a disk with two slot-like openings;

FIG. 10. a feed line in a cross section with two inner pipes in the area of the discharge openings, and FIG. 11. a feed line in a cross section with two inner pipes in the area of the inlet opening, and FIG. 12. a feed line with a shut off valve and a connecting line.

The drawing illustrates a feed line 1 for a pneumatic or hydraulic feeding of a dust-like, powdery or granulated bulk goods, wherein an inner pipe 2 is provided in the upper section in a reposed position. The bulk good is essentially fed in the feed line 1 and possibly by preventing plugs of goods by forming turbulences in the feeding medium. For this purpose, outlet openings 3 are disposed in inner pipe 2 through which the feeding means can discharge from the inner pipe 2 into the feeding line 1 for generating turbulences. An inlet opening 4 in inner pipe 2 is provided behind each outlet opening 3. A disk 5 is upright positioned in the inner pipe between these two openings 3 and 4 which is provided with an opening 6, so that not the total feed medium discharges from the inner pipe at the location of the openings from the inner pipe 2 to the feed line 1.

During the operation of the device a layer A of bulk goods forms on the bottom of the feeding line 1 which is to be assumed as resting. Thereabove is a continuous flowing layer B which is pushed by the dust in the feeding air predominantly in the direction of the arrow. The main amount of the feed goods is contained in this layer B, namely $\frac{2}{3}$ to $\frac{3}{4}$ of the same. Thereabove is the layer C as the actual air flow which contains dust of the fed goods due to the turbulences generated by the disks 5, that is, essentially more dust than was heretofore possible.

The disks 5 are height adjustable by means of screws 7. The inner pipe 2 is held in its distance away from the feed line by distance spacers 8.

The outlet openings 3 and the inlet openings 4 are shaped by bevelled cuts of the inner pipe in the embodiment of FIG. 1. The cut angle $\alpha$ of the outlet opening 3 is smaller, about 30° than the cut angle $\beta$ of the inlet opening 4 which is about 45°, so that the outlet opening 3 is not only larger than the inlet opening, but that the feeding air which discharges from the inner pipe 2 for the purpose of the stronger turbulence in the direction of the main flow discharges in the feed line 1, thus generating a long aeration path.

In the embodiment in accordance with FIG. 2, disk 5 with opening 6 is eccentrically disposed, so that the outlet opening 3 is also larger than the inlet opening 4.

FIG. 3 illustrates a disk 5 which is retained in a sleeve 9. The two end sections of the inner pipe 2 are inserted into sleeve 9. The inner pipe 2 is height adjustable with respect to the feed line 1 by means of screws 10. Thereby, the inlet and outlet openings are equally large in deviation from FIG. 4, wherein the outlet opening 3 is again larger than the inlet opening 4 due to an eccentric disposition of disk 5 within sleeve 9.

The advantageous arrangement of a disturbance edge 17 or 18 on the sleeve is illustrated in FIGS. 3 and 4.

An example is illustrated in FIG. 5, wherein the outlet opening 3 is deeper cut into the inner pipe 2 than the smaller inlet opening 4.

FIG. 6 illustrates a cylinder-like disk 5 with a jet-like opening 11. This design is preferably used when feeding particularly wearing goods.

A disk 5 may be larger in its diameter than the inner pipe 2 in accordance with FIG. 7. In accordance with FIG. 8 it may be provided with a plurality of openings 6 and 6', which are eccentrically disposed, as well as the slots 13 and 13' in disk 5 in accordance with FIG. 9.

FIG. 7 illustrates the Vortex-generators 19 mounted on the outside of the inner pipe in form of impeller like shoulders which are provided for extending the distance between the inlet and outlet openings.

In accordance with FIGS. 10 and 11 two or more inner pipes 2 and 2' may be disposed in a feed line 1, wherein the outlet openings 3 and 3' are directed obliquely to the side for enhancing the turbulence.

Accordingly, the inlet openings 4 and 4' may be disposed in opposite direction in accordance with FIG. 11.

The inlet opening is turned up to 180° with respect to the outlet opening with some goods to be fed in accordance with the invention.

It can be also recognized that partition walls 12 may be disposed between and above the two inner pipes 2 and 2'.

In order to achieve a dissolving of unintended plugs of goods which may get stuck in the feed line 1, connecting lines 15 are connected at a distance with the inner pipe and one each shut off valve 14 is provided in front of these connecting lines in accordance with FIG. 12. The connecting line 15 which is controlled by a control 16 permits the additional supply of compressed air into the inner pipe 2, through which a dividing of a plug of goods can be automatically performed.

We claim:

1. Device for pneumatic or hydraulic feeding of dust-like, powdery or granular bulk goods comprising a feed line forming a main passageway for conveying solid material therethrough, an inner pipe mounted within said feed line, said inner pipe being provided with a plurality of openings providing communication between said inner pipe and said feed line, a disk located within said inner pipe at the location of each opening and extending transversely across the inner pipe to divide each opening into an outlet opening and an inlet opening and at least one opening being provided in each disk.

2. Device in accordance with claim 1 wherein the opening (6) consists of a circular hole which is disposed in the center of the disk (5).

3. Device in accordance with claim 1 wherein the opening (6) consists of a slot (13,13').

4. Device in accordance with claim 1 wherein the opening (6) consists of a plurality of holes (6,6').

5. Device in accordance with claim 1 wherein the opening (6) has a size of 0.1–0.3 of the inner pipe.

6. Device in accordance with claim 1 comprising means to adjust the height of the disk.

7. Device in accordance with claim 1 wherein the disk (5) has a larger diameter than the inner pipe (2,2').

8. Device in accordance with claim 1 wherein the disk (5) is eccentrically disposed between the outlet and the inlet opening (3,4).

9. Device in accordance with claim 1 wherein the disk (5) is exchangeably mounted in the inner pipe (2).

10. Device in accordance with claim 1 wherein the disks (5) are disposed at a distance which corresponds to 1.5–4 the diameter of the feed line (2).

11. Device in accordance with claim 1 wherein the disk (5) supports a sleeve (9) with which the free ends of inner pipe is made of segments having free ends and the inner pipe segments are connected.

12. Device in accordance with claim 11 wherein disturbance edge (17, 18) are provided on the sleeves (9).

13. Device in accordance with claim 1 wherein the opening (6) is designed in a jet-like manner.

14. Device in accordance with claim 1 wherein the outlet opening (3) in front of the disk (5) is larger than the inlet opening (4) behind the disk (5).

15. Device in accordance with claim 1 wherein a cut angle ($\alpha$) in the outlet opening (3) in the inner pipe (2) is smaller than a cut angle ($\beta$) of the inlet opening (4).

16. Device in accordance with claim 1 wherein the outlet and inlet openings (3,4) are directed in different directions of the inner pipe (2).

17. Device in accordance with claim 1 wherein a plurality of inner pipes (2,2') with disks (5) are disposed in said feed line (1) and that the adjacent disks (5) have openings (3,3',4,4') directed to different sides.

18. Device in accordance with claim 17 wherein the disks of two inner pipes (2,2') are axially offset with respect to each other.

19. Device in accordance with claim 1 wherein separating walls (12) are provided between the inner pipe (2) and an upper part of the feed line (1).

20. Device in accordance with claim 1 wherein the feed line (1) and the inner pipe (2) are provided with shut off valves (14) behind which a closeable connecting line (15) is connected to the inner pipe (2).

21. Device in accordance with claim 1 wherein smaller impeller like shoulders (19) are mounted on the sides along the inner pipe (2).

* * * * *